United States Patent
Nystrom et al.

(10) Patent No.: US 8,200,230 B2
(45) Date of Patent: Jun. 12, 2012

(54) METHOD AND MEANS FOR REDUCING INTERFERENCE PEAKS DURING SOFT HANDOVER

(75) Inventors: Lars-Ola Nystrom, Spanga (SE); Thomas Ostman, Spanga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 994 days.

(21) Appl. No.: 11/917,774

(22) PCT Filed: Jun. 15, 2005

(86) PCT No.: PCT/SE2005/000919
§ 371 (c)(1),
(2), (4) Date: Jul. 22, 2008

(87) PCT Pub. No.: WO2006/135286
PCT Pub. Date: Dec. 21, 2006

(65) Prior Publication Data
US 2009/0143069 A1      Jun. 4, 2009

(51) Int. Cl.
*H04W 36/00* (2009.01)
(52) U.S. Cl. ........ 455/442; 455/436; 455/423; 455/453; 455/522; 370/331; 370/329; 370/341; 370/328
(58) Field of Classification Search .............. 455/442, 455/436, 423, 453, 522; 370/331, 329, 328, 370/341
See application file for complete search history.

(56) References Cited

U.S. PATENT DOCUMENTS

| 6,498,934 | B1 * | 12/2002 | Muller | 455/450 |
| 6,735,447 | B1 * | 5/2004 | Muller | 455/522 |
| 2004/0110524 | A1 * | 6/2004 | Takano et al. | 455/522 |
| 2006/0246936 | A1 * | 11/2006 | Gross et al. | 455/522 |
| 2007/0097920 | A1 * | 5/2007 | Chen et al. | 370/331 |
| 2007/0149201 | A1 * | 6/2007 | Dominique et al. | 455/442 |
| 2008/0280611 | A1 * | 11/2008 | Miklos et al. | 455/436 |
| 2011/0237244 | A1 * | 9/2011 | Hiltunen et al. | 455/423 |

FOREIGN PATENT DOCUMENTS
EP            1081977 A1 *  3/2001
* cited by examiner

*Primary Examiner* — Ajit Patel
*Assistant Examiner* — Khai M Nguyen

(57) ABSTRACT

The invention relates to a method for reducing the number of uplink interference peaks during soft handover from a radio base station (RBS A) providing a source cell (12) to a radio base station (RBS B) providing a target cell (13) in a cellular mobile communication system. The invention also relates to radio base station (RBS) and a radio network controller (RNC) specifically designed for carrying out the method. The RNC orders RBS B of the target cell to set up a link to a mobile (MS) involved in the soft handover procedure. Further the RNC orders the mobile to start listening for RBS B of the target cell and to synchronize to RBS B. RBS B synchronizes with the mobile in a downlink (6) but not in the uplink. The invention is characterized in that the RNC orders RBS A to set a RF transmission power floor below which its transmission power must not fall when the mobile receives RBS B in the target cell stronger than RBS A and perceives the signal in the downlink from RBS B too strong. Further the RNC orders RBS A to set said floor active for a predefined period of time.

10 Claims, 4 Drawing Sheets

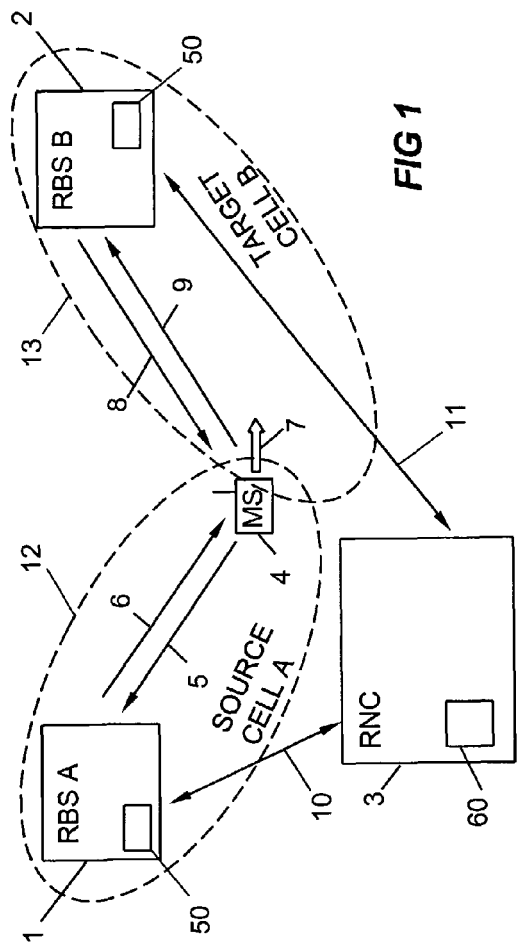
FIG 1
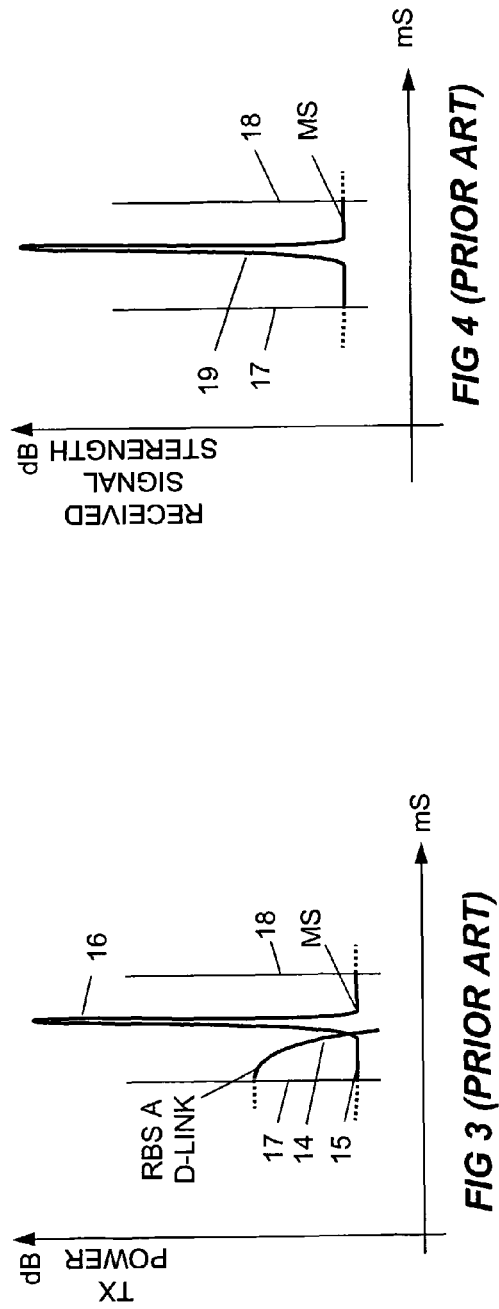
FIG 3 (PRIOR ART)
FIG 4 (PRIOR ART)

METHOD AND MEANS FOR REDUCING INTERFERENCE PEAKS DURING SOFT HANDOVER

TECHNICAL FIELD OF THE INVENTION

The present invention relates to a method, a radio base station (RBS), and a radio network controller (RNC) for reducing interference peaks during soft handover in a cellular telecommunication system.

In 3GPP a RBS is called Node B and a mobile is called UE. The terms Node B and UE are not used in the following, but it should be understood they are within the scope of a RBS and a mobile station respectively.

DESCRIPTION OF RELATED ART

When soft handover is made in a WCDMA system uplink power peaks can occur in the uplink.

Power peaks are not wanted because they cause interference. They impair a radio base station's reception of other mobiles. The radio base station will therefore instruct them to increase their respective transmission powers. This leads to a non-desired party effect which increases the system's transmission power level. Once the system's power level has been raised it can take a long time for the power level to return to its original level.

The present invention is concerned with interference power peaks that can occur during handover. These interference power peaks are due to a system ordered power ramping of the mobile. These power peaks occur: (a) when the mobile's received signal strength in the downlink from a base station in a target cell is stronger than the mobile's received signal strength in the downlink from a base station in the source cell, and (b) the uplink to the base station in the target cell is not in synchronism with the base station in the target cell. If the RBS in-synch time for an individual mobile is long and condition a) above is fulfilled, there is a high probability that it will generate an interference power peak with the result that the reception of other mobiles is impaired and their in-synch times become long too, thereby increasing the probability that they also will generate interference peaks.

If both conditions a) and b) above are fulfilled an interference peak may occur. In practice this means that a mobile in motion will generate such peaks when its radio location is impaired, for example moves into a radio shadow caused by buildings, hills, trees etc.

In order to avoid interference power peaks of this kind it is known to set the transmission power of the base station in the target cell so that the mobile receives the downlink of the target cell weaker than it receives the downlink of the source cell. This measure will reduce the probability that power peaks occur.

Another way to avoid interference peaks of the discussed kind is to make the synch-in time of the uplink as short as possible. A short in-synch time, however, does not take away the possibility that interference power peaks appear.

SUMMARY OF THE INVENTION

An object of present invention is eliminate interference power peaks during soft handover by providing a method, a radio base station and a radio network controller that provides a controlled reduction of the downlink transmission power of the RBS in the source cell.

This is achieved by providing a threshold transmission power level below which the downlink transmission power of the RBS in the source cell cannot decrease during a soft handover operation.

There are several means and measures by which the threshold can be provided. It may be set by parameters in the software run in the RBS at the source cell or in the RNC, or it may be set to any current transmission power with which the RBS in the source cell transmits during the soft handover operation.

The advantage achieved by the invention is that the mobile is prevented from generating uplink transmission power peaks that during the soft handover operation rise in a non-controlled manner until they reach the maximum power with which the mobile is allowed to transmit. By reducing or greatly limiting such non-controlled power peaks, interference in the system is reduced.

BRIEF DESCRIPTION OF THE DRAWINGS

FIG. 1 is an overview of a cellular mobile telecommunication system wherein a mobile station is performing a soft handover operation, FIG. 3 is diagram illustrating transmission power curves for the mobile and the downlink of RBS A in accordance with prior art, FIG. 4 is diagram illustrating signal strength curves of the signals received by RBS B in accordance with prior art.

Figure 2:
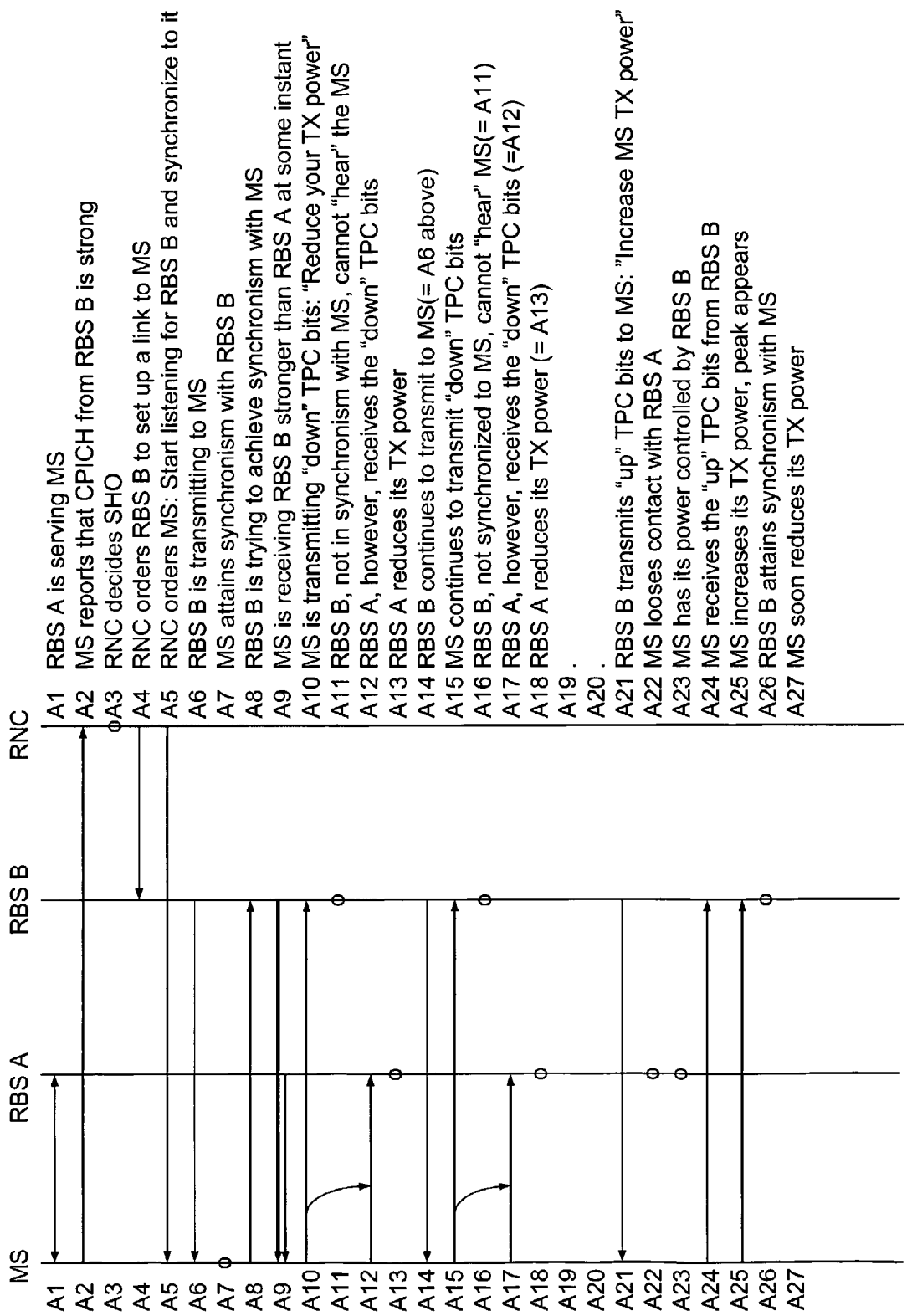
FIG. 2 is a signalling scheme illustrating a soft handover operation according to prior art.

In order to get an better understanding of the invention it is first described how a soft handover is implemented in accordance with prior art. The actions and signalling taking place during a soft handover will be described in connection with FIG. 1 and the signalling and event scheme shown in FIG. 2. The right portion of FIG. 2 comprises a list of action or event points labeled A1, A2, A27. The same signs A1, A2, A27 appear to the left in FIG. 2 to facilitate identification of the signalling arrows and event circles shown in the central part of FIG. 2.

In FIG. 1 there is shown a part of a WCDMA based cellular telecommunication system comprising a source cell A and a target cell B, radio base stations 1 and 2, below also referred to as RBS A and RBS B, and a radio network controller (RNC) 3. A mobile station (MS) 4 is served by RBS A, as shown at action point A1 in FIG. 2. Communication between RBS A and MS 4 takes place on an uplink 5 and a downlink 6. Arrow 7 illustrates movement of the MS. Communication between RBS B and MS 4 takes place an downlink 8 and an uplink 9. RNC 3 communicates with RBS A and RBS B as shown by the double headed arrows 10 and 11. RBS A provides a cell 12 and RBS B provides a cell 13. Since the target for the soft handover is RBS B, cell 13 is called the target cell. Source for the handover is RBS A and therefore cell 12 is called the source cell. RBS A has means 50, RBS B means 50 and RNC means 60 for RF power control.

In WCDMA power control with 1.5 kHz is supported in both uplink and downlink. Typically a power control step size of 1.0 dB is used. A power control command comprises transmission power control bits (TPC bits) sent at a rate of 1.5 kHz. A power control command "down", i.e. "decrease your transmission power", comprises a TPC bit set to 0 and a power control command "up" comprises a TPC bit set to 1.

As the mobile MS moves away from RBS A it requests RBS A to increase its transmission power. Similarly RBS A requests the mobile to increase its transmission power.

Upon entry in the target cell 13 the mobile detects, on the common pilot channel (CPICH), that there is a new, strong base station, RBS B, in its vicinity. The mobile reports this to the RNC by transmitting a corresponding event to the RNC via RBS A, as shown at action point A2 in FIG. 2. The RNC adds the new RBS to the mobile's base station candidate list. The mobile emits consecutive signal strength reports to the RNC and indicates therein the signal strength with which it receives pilot tones from each base station it can hear, in this case RBS A and RBS B, on the CPICH. When RNC detects there is a predefined difference in the reported signal strengths on downlinks 6 and 8 it takes a decision to initiate handover, action point A3. The RNC sends a corresponding order to the mobile. The RNC further orders RBS B to set up a downlink 8 to the mobile, action point A4. The RNC also orders RBS B to synchronise on an uplink 9 from the mobile. At the same time the RNC orders the mobile to listen for the new base station, action point A5.

RBS B starts transmitting towards the mobile, action point A6. The timing of RBS B in the downlink 8 is such that it will hit the mobile's reception window and the mobile will synchronize almost instantaneously, action point A7.

In the uplink 9 RBS B has no information on the timing so it will start a wide window search in an attempt to find the mobile and its timing. RBS B will thus try to achieve synchronism with the mobile, action point A8.

Generally seen, it is much easier for a mobile to synchronize with an RBS than there is for an RBS to synchronize with a mobile. The implication is that the time it takes for the RBS to synchronize with a mobile is longer than the time it takes for a mobile to synchronize with an RBS.

RBS B, not being in synchronism with the mobile, i.e. not hearing the mobile, starts transmitting a series of power control commands "up", i.e. a series of TPC bits 1, 1, 1, ... 1, in the downlink 8 each such bit telling the mobile "Increase your power, I cannot hear you". Such a transmission must take place in accordance with the 3GPP standards.

A vulnerable state has now developed; two base stations are transmitting simultaneously to the mobile and one of them, RBS B, is not in synchronism with the mobile it is sending to.

The mobile combines the TPC bits it receives from RBS A with those it receives from RBS B. RBS B is continuously transmitting "up" TPC bits. RBS A is sending "up" TPC bits mixed with "down" TPC bits depending on the signal strength with which RBS A receives the mobile on the uplink 5.

Table 1 below is a table illustrating how the mobile responds to the "up" and "down" TPC bits received on the downlinks 6 and 8.

TABLE 1

| RBS A TPC bits | RBS B TPC bits | Mobile's response |
|---|---|---|
| 1 | 1 | Increase power |
| 0 | 1 | Decrease power |

As long as RBS B is transmitting "1" TPC bits the mobile will follow the TPC bits transmitted from RBS A. RBS A will thus be in control of the mobile's transmission power. If RBS A orders the mobile to increase its power the mobile will do so and if RBS A orders the mobile to decrease its power the mobile will do so. When the mobile adjusts its transmission power, its uplinks 5 and 9 are correspondingly adjusted. As long as the downlink 6 from RBS A exists this link will be the one that regulates the mobile's transmission power.

In the uplink direction, the mobile sends a single command to control the downlink transmission powers. Both RBS A and RBS B will detect the command and will adjust their transmission powers accordingly. The single downlink power control command is transmitted on the uplinks 5 and 9.

If:
(c) the signal strength of the signal received in the downlink 6 from RBS A for one reason drops below the signal strength of the signal received in the downlink 8 from RBS B, action point A9, and
(d) the mobile perceives the signal in the downlink 8 from RBS B as being too strong,
the mobile will react by transmitting "down" TPC bits, action point A10.

With too strong is meant that the mobile receives the signal from RBS B stronger than the signal from RBS A.

There are many reasons that may cause a situation wherein the mobile receives RBS B stronger than RBS A. One typical example is that the mobile moves into an area of radio shadow relative to RBS A. Another example is that the mobile moves fast into the target cell. If the source and target cells are small their common overlap region is small. If the mobile moves fast it will pass the overlap region swiftly and will receive RBS B stronger than RBS A.

Since RBS B is not synchronized in the uplink it cannot hear the "down" TPC bits, action point A11. They are, however, heard by RBS A, action point A12. In response RBS A reduces the transmission power, action point A13, in its downlink 6.

Action points 9-13 are repeated cyclically as indicated by action points A14-A18. In each cycle RBS A reduces its transmission power.

After a short period of time the transmission the power in downlink 6 becomes so weak that the mobile cannot hear RBS A. The mobile will loose its synchronization with RBS A, action point A22. The signals from RBS A will disappear. RBS B, still sending "up" TPC bits, will take control over the mobile's transmission power, action point A23.

The mobile receives the "up" TPC bits continuously sent from RBS B. In response the mobile starts increasing its transmission power, action point A24.

A transmission power peak appears, action point A25. This is because TPC bits typically are transmitted with a frequency of 1500 kHz and each "up" signal increases the transmission power by 1 dB. It is therefore a matter of milliseconds until the mobile is transmitting with its full transmission power.

At some time instant during the soft handover process RBS B will hear the mobile on the uplink 9 and will synchronize with it, action point A26. In-synch may take place before a power peak develops, it may take place at a leading edge of a power peak, or it may take place after a power peak. The magnitude of a power peak will depend on the time instant when in-synch takes place and may thus be different for different mobiles in the system. When synchronism has been attained RBS B starts sending "down" TPC bits and the mobile reduces its transmission power very fast and very soon, action point A27.

In FIG. 3 curve 14 illustrates the transmission power of RBS A in the downlink and curve 15 the transmission power of the mobile versus time. The power peak is labeled 16. The signals received by the mobile are not shown. The transmission power of RBS B in the downlink is not indicated since its is not yet controlled by the mobile. The curves are shown within a time segment around the power peak. The limits of the time segment are marked by the vertical lines 17 and 18. Vertical line 17 represents the time instant at which the two conditions (c) and (d) described above in connection with action point A10 are fulfilled. The magnitude of the power peak is dependent of the distance between the mobile and the radio base station. Typically the duration of a power peak may be in the order of 100 to 200 ms.

FIG. 4 illustrates RBS B's received signal strength versus time. Curve 19 in FIG. 4 reflects the power with which RBS B receives the mobile in uplink 9 within the same time segment shown in FIG. 3.

Preferred Embodiments of the Invention

Figure 5:
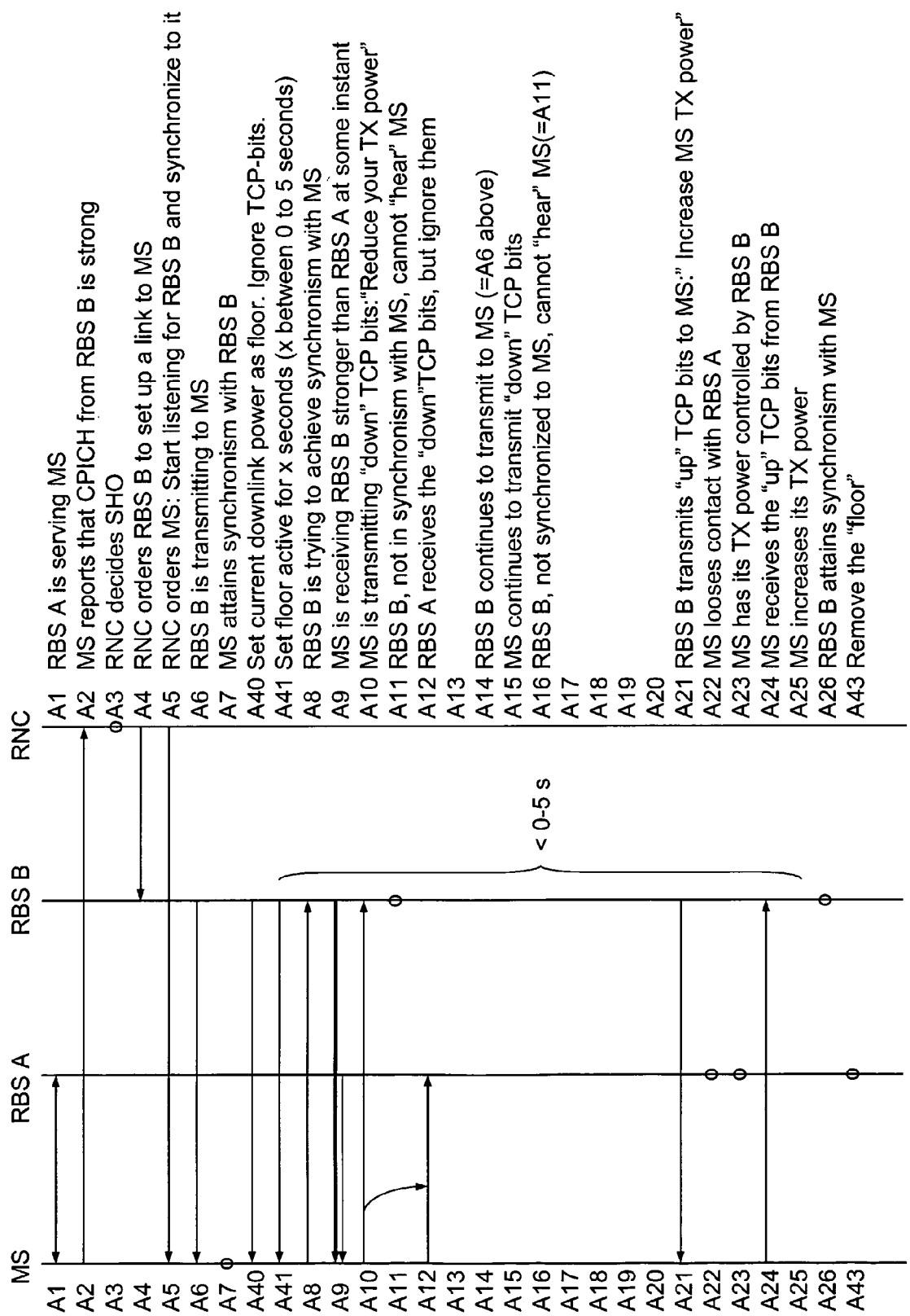
FIG. 5 is a signalling scheme illustrating a soft handover operation in accordance with the present invention.
Figure 6:
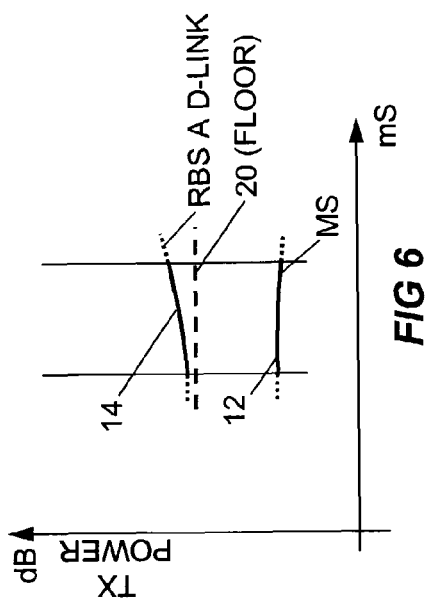
FIG. 6 is a diagram similar to FIG. 3 but now illustrating the present invention.

Refer to FIGS. 5 and 6 illustrating the present invention. Same action points in FIGS. 2 and 4 have the same signs. The beginning of the soft handover procedure is the same, action point A1-A7.

Before the new radio link to RBS B is added, the RNC will inform RBS A, for example over NBAP interface, about this forthcoming procedure. With this information at hand RBS B takes measures to prevent the problematic scenario described above where RBS A reduces its transmission power in accordance with action points A9, A18 before the uplink to RBS B is synched in.

Next a preferred transmission power scheme for RBS A is described. When the RNC, via RBS A, tells the mobile to start listening for RBS B in action point A5 it orders RBS A to set a "floor" on the transmission power in its downlink, action point A40. The floor is set equal to the current transmission power level used by RBS A.

Simultaneously RBS A is ordered to ignore "down" TPC bits if the transmission power of RBS A goes below the floor, action point A40. RBS A is thus allowed to transmit with a power above the floor, but never with a power below the floor.

The RNC also orders RBS A to set the floor active for a predefined time, action point A41. The predefined period of time is set to some value somewhere between about 0-5 seconds, preferably 0.5-3 seconds. Experiments have shown that most base stations have an in-synch time less than about 5 seconds. A time period is therefore set, because it is not desired to have the situation with a floor too long, since it takes system resources. The indicated time period has thus been set so that one can be sure that the in-synch process should have taken place.

If the mobile now receives RBS B stronger at some arbitrary instant, action point A9, the probability that the mobile looses synchronization with RBS A's downlink will be reduced thanks to the measures taken. If this probability is reduced also the probability that the mobile generates power peaks will be correspondingly reduced.

FIG. 6 illustrates the transmission power versus time during the same period of time as in FIGS. 3 and 4. Curve 14 is transmission power of RBS A in the downlink, curve 15 is the mobile's transmission power in the uplink and dashed line 20 represents the floor. RBS A will maintain its downlink, the mobile responds to control signals from RBS A and will not generate power peaks. As appears power in the downlink from RBS A will increase as the distance to RBS A increases when the mobile moves deeper into the target cell. This is so, because the mobile wants to receive RSSB A with a constant signal strength and therefore signals to RBS A to increase the transmission power as the mobile's distance to RBS A increases.

Power peaks may still be generated if conditions (c) and (d) are fulfilled, for example if the geographical location of the mobile is such that it looses contact with RBS A, but now at a considerable lower rate.

During the time segment between vertical lines 17, 18 RBS A will continue to control the mobile's transmission power, the mobile will respond to these signals, the mobile will continue to send "down" TPC signals (condition (d)) in the up link and RBS B will continue to transmit "up" TPC signals to the mobile in its downlink.

Action points A12-A27 will still take place except from A13, A17 and A18 which will not take place.

After action point A11 it may happen the mobile orders RBS A to increase its power and RBS A will act accordingly. If such an power increase is followed by "down" TPC-bits from the mobile, RBS A will reduce its power until the floor is reached, but it will not reduce it below the floor.

The mobile synchronizes with RBS B in the uplink, action point A26, when it is hearing RBS B. Synchronization can occur at almost any time and depends for example on the mobile's geographical position in relation to RBS B, and the terrain between the mobile and RBS B. Another example that triggers synchronization is that the mobile may raise its transmission power. For example when the mobile looses its radio contact with RBS A it will hear the "up" TPC bits in RBS B's downlink and increase its transmission power.

Upon synchronisation in the uplink both links 8 and 9 are operating. The synchronized state is reported by RBS B to the RNC. In response the RNC orders RBS A to remove the floor, action point A43. RBS A removes the floor and the soft handover procedure is completed. RBS B will now control the mobile's transmission power.

Figure 7:
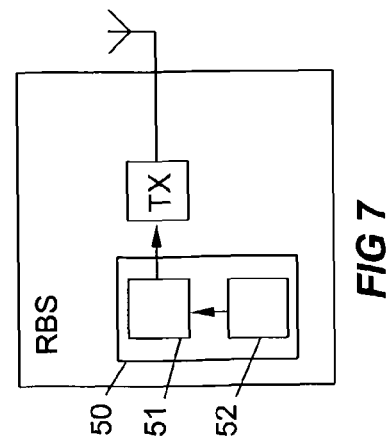
FIG. 7 is a block diagram of an RBS in accordance with the invention.

FIG. 7 is a block diagram of an RBS in accordance with the invention. Only the means of importance for the present invention are shown. These comprise RF power control means 50 regulating the RF power of transmitter TX connected to an antenna. The RF power control means comprises floor setting means 51 connected to the TX and adapted to set the floor for the transmission power in the downlink from RBS A. floor setting means active during the predefined period of time. Further the RF power control means comprises activating means 52 for activating the floor setting means when the RNC orders RBS B to set up a link to the mobile and for removing the floor when synchronization in the uplink to RBS B has been achieved. It should be understood the RBS comprises conventional means known to the man skilled in the art and therefore not shown in the drawing.

Figure 8:
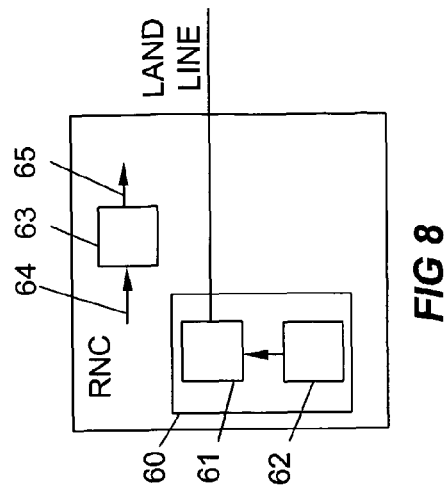
FIG. 8 is a block diagram of an RNC in accordance with the present invention.

FIG. 8 is a block diagram of an RNC in accordance with the invention. Only the means of importance for the present invention are shown. These comprise signalling means 60 signalling the RF transmission power to be used by an individual RBS. The signalling means further comprises floor signalling means 61 for setting the floor for the RF transmission power level to be used in the downlink of an RBS and for signalling the level of the floor to the RBS. The signalling means further comprises activating means 62. The RNC further comprises timing means 63. The activating means signals is connected to the floor signalling means. It activates the floor setting means the time instant at which the floor should be activated and deactivated respectively. As indicated previously the floor is set when the RNC orders RBS B to set up a link to the mobile and it is deactivated when RBS B reports a state of in synch in the up link. The timing means 63 sets the time period within which synchronization must take place, said time period being in the order of somewhere between about 0-5 seconds, preferably 0.5-3 seconds. The timing means is activated by a trigger signal 64 when conditions (c)

and (d) above are fulfilled and may be embodied by a mono stable flip flop. The output of the timing means is connected to non-shown control logic for the soft handover procedure as illustrated by arrow 65.

Alternative Embodiments

Above the transmission scheme for the RBS A is such that the current downlink transmission power of RBS A is used as a minimum transmission power. Another transmission scheme is to allow the downlink power to be regulated upwards only, newer downwards. If a RBS A power increase that takes place after action point A21 is followed by several "down" TPC bits from the mobile, RBS A is not allowed to reduce its power. Such a transmission scheme will act as a diode. Every time RBS A receives an "up" TPC bit from the mobile it will increase its power, and this will continue until RBS B has synchronized in its uplink 9.

Other transmission schemes can also be applied. As mentioned above the new transmission power scheme for RBS A is applied for some configurable time, e.g. a value between 0-5 seconds, or it can be applied until the RNC informs RBS A that uplink synch in RBS B has been achieved.

Instead of setting the floor equal to the current power of RBS A in action point A40, the floor can be set to a fixed value relative to the current power. As an example the value may be +5 dB. If for example the current transmission power is 25 dBm the floor is set to 30 dBm.

Instead of setting a floor equal to the current power or to a fixed value relative to the current transmission power, it is possible to set the transmission power, to be used as a floor, in parameters that are loaded into a base station or into an RNC at system configuration. Also the time the floor should be active may be set by parameters.

The floor is preferably constant over time, but may also varies as a function over time. For example the floor may fall slowly with time, thereby increasing the time the source cell controls the mobile. As another example the floor may rise slowly with time, thereby decreasing the time the source cell is controlling the mobile.

To-day there are no signalling standards supporting an RNC to order a base station to set a floor, nor are there any standards that support an RNC to set a floor relative to the base station's current transmission power. This is so because it is only the base station that has knowledge of its transmission power; the RNC is not aware of the base station's transmission power. Further, it is only the RNC that knows the time instant a floor should be set. Current signalling standards, however, support that an RNC can order a RBS to set a certain transmission power. Further, standards allow to set a maximum power and minimum power for the downlink. Exemplary the maximum power may be set to 1 W and the minimum power to 30-40 mW in the downlink. In accordance with an alternate embodiment of the invention the RNC dupes RBS A and orders it to set the minimum power level in its downlink 6 to an impossible transmission power value, for example 100W. When receiving this order RBS A will set its minimum power in the downlink to the power with which it is currently transmitting. RBS A will understand that the ordered minimum power value is larger than its maximum power value and will as a result set the minimum power to its current transmission power. Using this trick the system is so to say cheated, but the result is the intended one, power peaks will be eliminated.

The invention claimed is:

1. A method of reducing the number of uplink interference peaks during soft handover of a mobile station (MS) from a radio base station (RBS) A of a source cell to a radio base station (RBS) B of a target cell in a cellular mobile communication system, the method comprising the steps of:
 a radio network controller (RNC) ordering RBS B in the target cell to set up a link to the MS involved in the soft handover procedure;
 the RNC ordering the MS to start listening for RBS B in the target cell and to synchronize to RBS B in the target cell; and
 RBS B in the target cell synchronizing with the MS in a downlink;
 wherein the method is characterized by the RNC ordering RBS A in the source cell:
 to set a transmission power floor below which transmission power of RBS A must not fall; and
 to set said floor active for a predefined period of time;
 wherein the floor is set equal to the current transmission power of RBS A in the source cell or is set to a predefined value relative to the current transmission power of RBS A in the source cell; and
 wherein the floor is set to the current transmission value of RBS A in the source cell by the RNC signaling to RBS A in the source cell, an order to set as the minimum transmission power in RBS A's downlink, a value that exceeds the maximum transmission power allowed in RBS A's downlink, thereby causing RBS A to set its minimum transmission power in the downlink to the power with which RBS A is currently transmitting.

2. The method in accordance with claim 1, characterized in that the period of time is selected in the order of 0.5 seconds to 3 seconds, so as to allow the MS to synchronize with RBS B in the target cell in the uplink.

3. The method in accordance with claim 1, characterized in that the floor is constant over time.

4. The method in accordance with claim 1, characterized in that the floor varies as a function over time.

5. The method in accordance with claim 1, characterized in that the floor is set at a time instant when the RNC orders the mobile to start listening for RBS B.

6. The method in accordance with claim 1, characterized in that the floor is set by parameters at system configuration.

7. A first radio base station (RBS) in a cellular communication system specifically designed for carrying out a method of reducing the number of uplink interference peaks during soft handover from the first RBS of a source cell to a second RBS of a target cell in the cellular mobile communication system, the soft handover being orchestrated by a radio network controller (RNC), said first RBS being configured to perform the following in response to an order from the RNC:
 set a transmission power floor below which the transmission power of the first RBS must not fall in the downlink; and
 set said floor active for a predefined period of time;
 wherein the floor is set equal to the current transmission power of the first RBS in the source cell or is set to a predefined value relative to the current transmission power of the first RBS in the source cell; and
 wherein the floor is set to the current transmission value of the first RBS in the source cell when the first RBS receives from the RNC, an order to set as the minimum transmission power in the first RBS's downlink, a value that exceeds the maximum transmission power allowed in the first RBS's downlink, thereby causing the first RBS to set its minimum transmission power in the downlink to the power with which the first RBS is currently transmitting.

8. The first radio base station in accordance with claim 7, further configured to activate and deactivate the setting of the transmission power floor.

9. A radio network controller (RNC) in a cellular communication system specifically designed for carrying out a method of reducing the number of uplink interference peaks during soft handover from a first radio base station (RBS) of a source cell to a second radio base station of a target cell in a communication system, the radio network controller configured to perform the following:
- set a transmission power floor below which transmission power of the first RBS must not fall in the downlink during the handover; and
- set a time period within which the handover procedure must occur;
- wherein the floor is set equal to the current transmission power of the first RBS in the source cell or is set to a predefined value relative to the current transmission power of the first RBS in the source cell; and
- wherein the floor is set to the current transmission value of the first RBS in the source cell by the RNC signaling to the first RBS in the source cell, an order to set as the minimum transmission power in the first RBS's downlink, a value that exceeds the maximum transmission power allowed in the first RBS's downlink, thereby causing the first RBS to set its minimum transmission power in the downlink to the power with which the first RBS is currently transmitting.

10. The radio network controller in accordance with claim 9, further configured to provide a trigger signal for triggering the setting of the time period within which the handover procedure must occur.

* * * * *